United States Patent
Oh

(10) Patent No.: US 10,910,687 B2
(45) Date of Patent: Feb. 2, 2021

(54) METHOD FOR PREPARING LITHIUM AIR BATTERY INCLUDING NITROGEN-DOPED CARBON CATHODE

(71) Applicants: Hyundai Motor Company, Seoul (KR); KIA Motors Corporation, Seoul (KR)

(72) Inventor: Gwang Seok Oh, Seoul (KR)

(73) Assignees: Hyundai Motor Company, Seoul (KR); KIA Motors Company, Seoul (KR)

(*) Notice: Subject to any disclaimer, the term of this patent is extended or adjusted under 35 U.S.C. 154(b) by 255 days.

(21) Appl. No.: 16/194,684

(22) Filed: Nov. 19, 2018

(65) Prior Publication Data
US 2020/0083577 A1     Mar. 12, 2020

(30) Foreign Application Priority Data

Sep. 11, 2018  (KR) .................. 10-2018-0108043

(51) Int. Cl.
| | |
|---|---|
| *H01M 12/08* | (2006.01) |
| *H01M 4/96* | (2006.01) |
| *H01M 4/38* | (2006.01) |
| *H01M 4/88* | (2006.01) |
| *H01M 4/02* | (2006.01) |
| *H01M 4/86* | (2006.01) |

(52) U.S. Cl.
CPC .......... *H01M 12/08* (2013.01); *H01M 4/382* (2013.01); *H01M 4/8817* (2013.01); *H01M 4/96* (2013.01); *H01M 2004/027* (2013.01); *H01M 2004/8689* (2013.01)

(58) Field of Classification Search
CPC ...... H01M 12/08; H01M 4/96; H01M 4/8817; H01M 4/382; H01M 2004/027; H01M 2004/8689; H01M 4/8878; H01M 2300/0025; Y02E 60/10
See application file for complete search history.

(56) References Cited

U.S. PATENT DOCUMENTS

| | | | |
|---|---|---|---|
| 2015/0357846 A1* | 12/2015 | Chen .................. | H02J 7/007 320/128 |
| 2015/0376817 A1* | 12/2015 | Xu .................... | D01F 11/16 546/27 |

OTHER PUBLICATIONS

Li, Yongliang, et al., "Carbon black cathodes for lithium oxygen batteries: Influence of porosity and heteroatom-doping," Carbon, 64, 2013, p. 170-177.

* cited by examiner

*Primary Examiner* — Lisa S Park
(74) *Attorney, Agent, or Firm* — Brinks Gilson & Lione

(57) ABSTRACT

Disclosed is a method for manufacturing a lithium air battery including a nitrogen-doped carbon cathode, more specifically, a method for manufacturing a lithium air battery including a nitrogen-doped carbon cathode that can inhibit side reactions between a carbon cathode and an electrolyte, and thus improve battery stability by doping the carbon cathode with nitrogen by repeatedly conducting initial charge/discharge an appropriate number of times on a lithium air battery containing a first electrolyte with a low viscosity, and is eco-friendly due to using a non-destructive manner as compared to conventional methods, and can inhibit an electrolyte depletion phenomenon and improve battery lifespan by further including a second electrolyte with a high viscosity.

15 Claims, 9 Drawing Sheets

[FIG. 1]
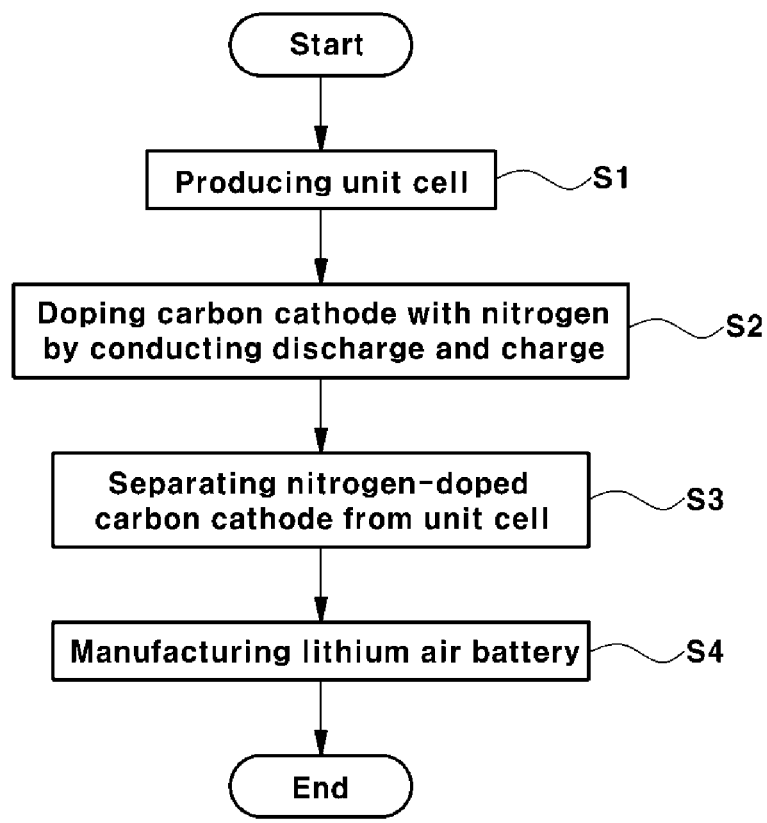

[FIG. 2]
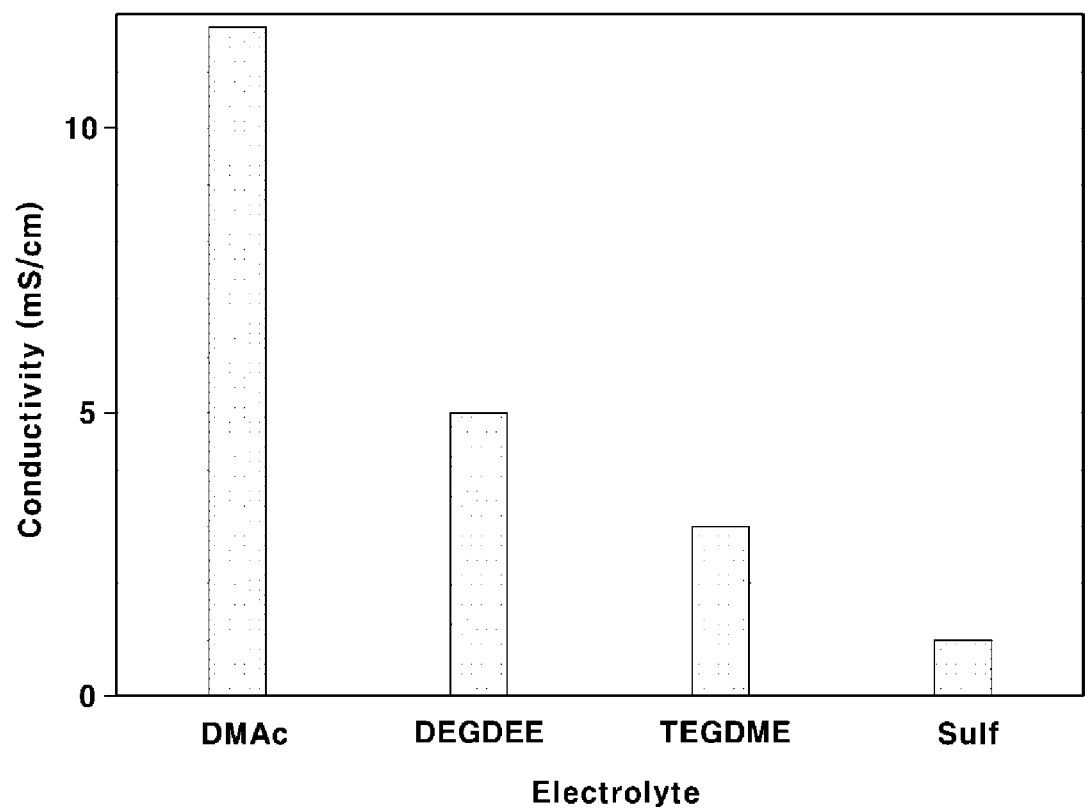

[FIG. 3]
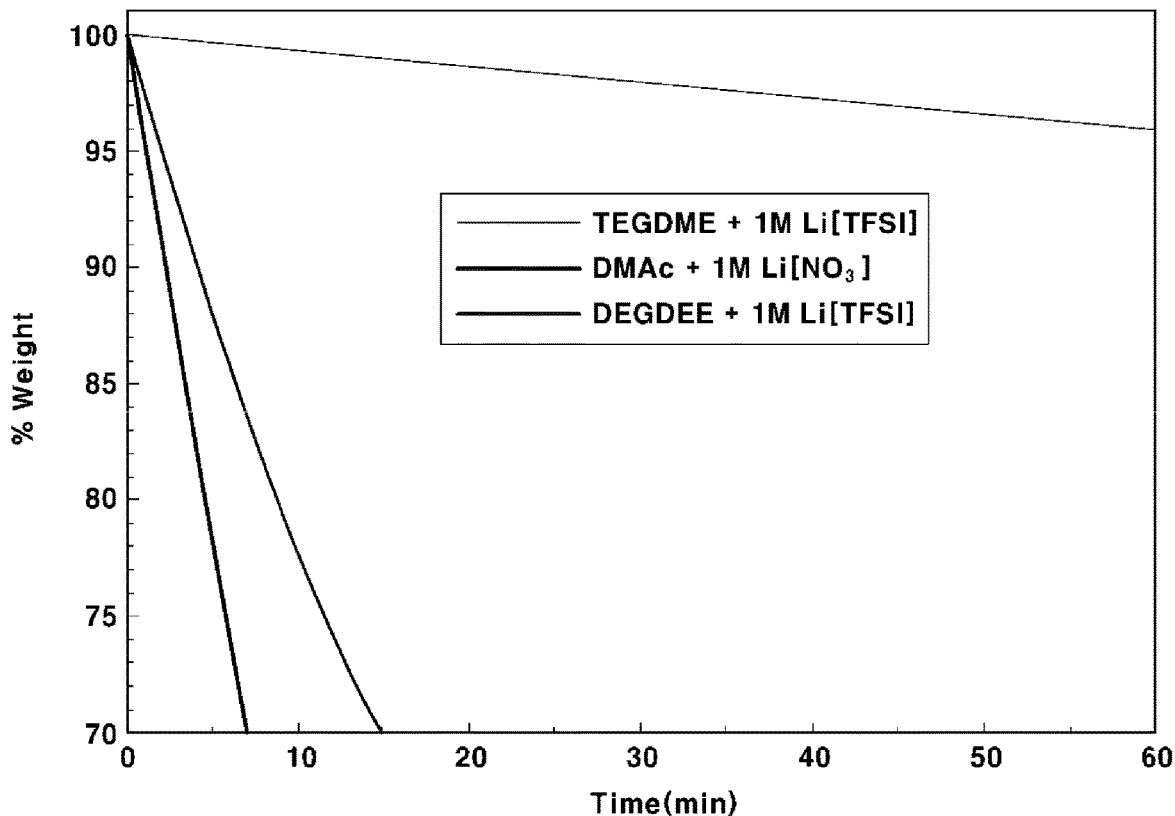
[FIG. 4A]
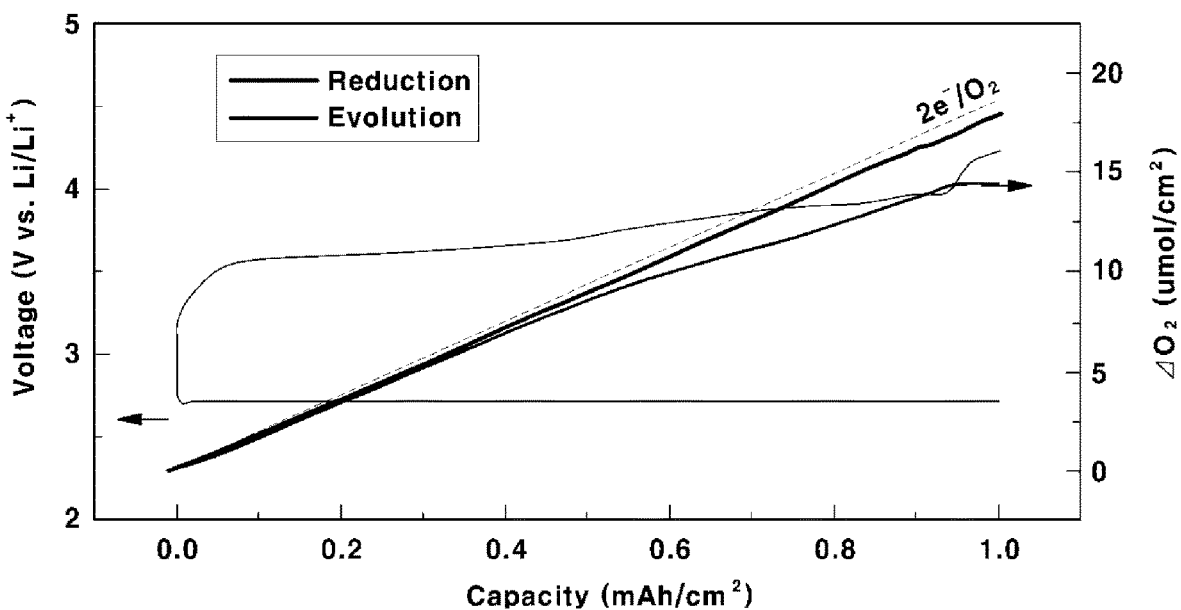

[FIG. 4B]
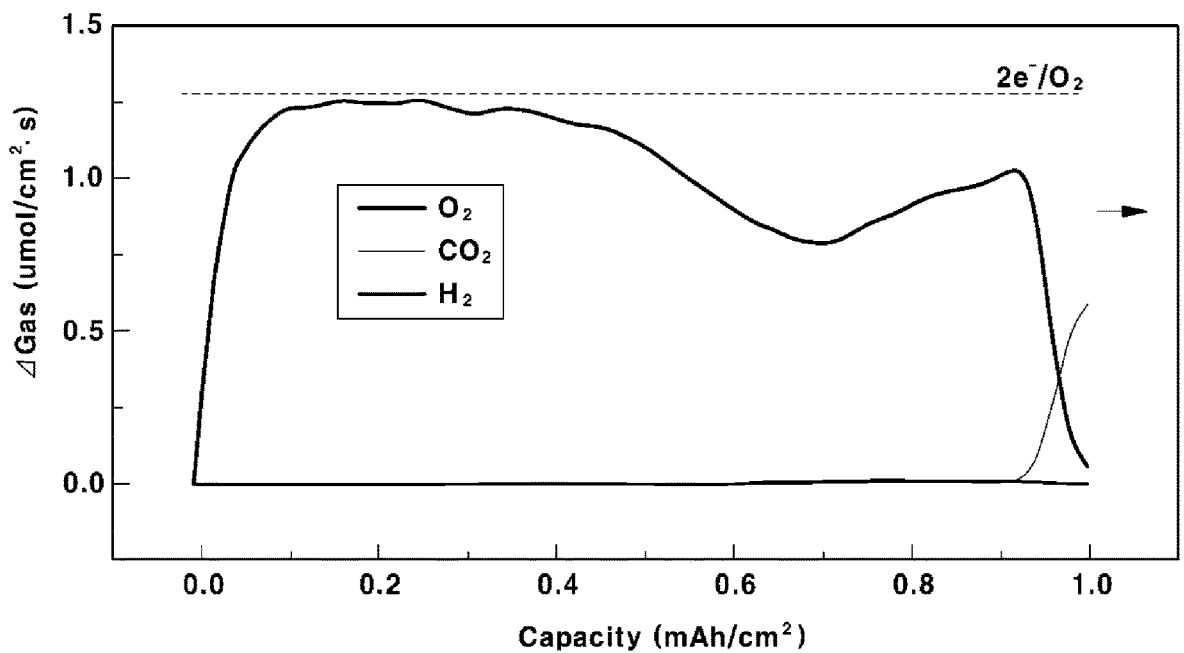
[FIG.5A]
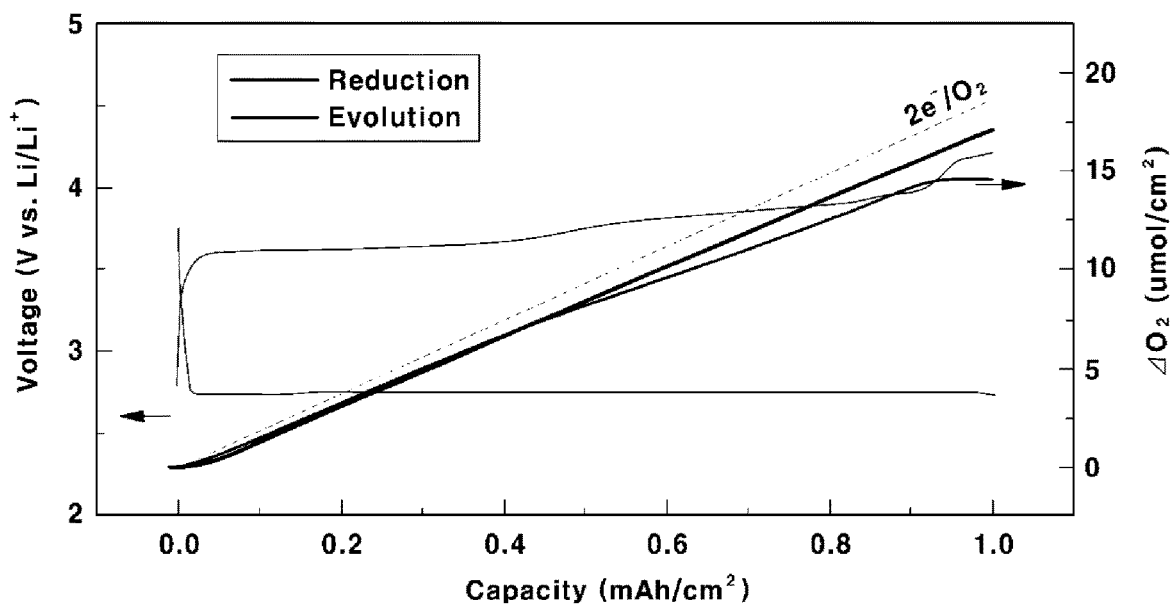

[FIG. 5B]
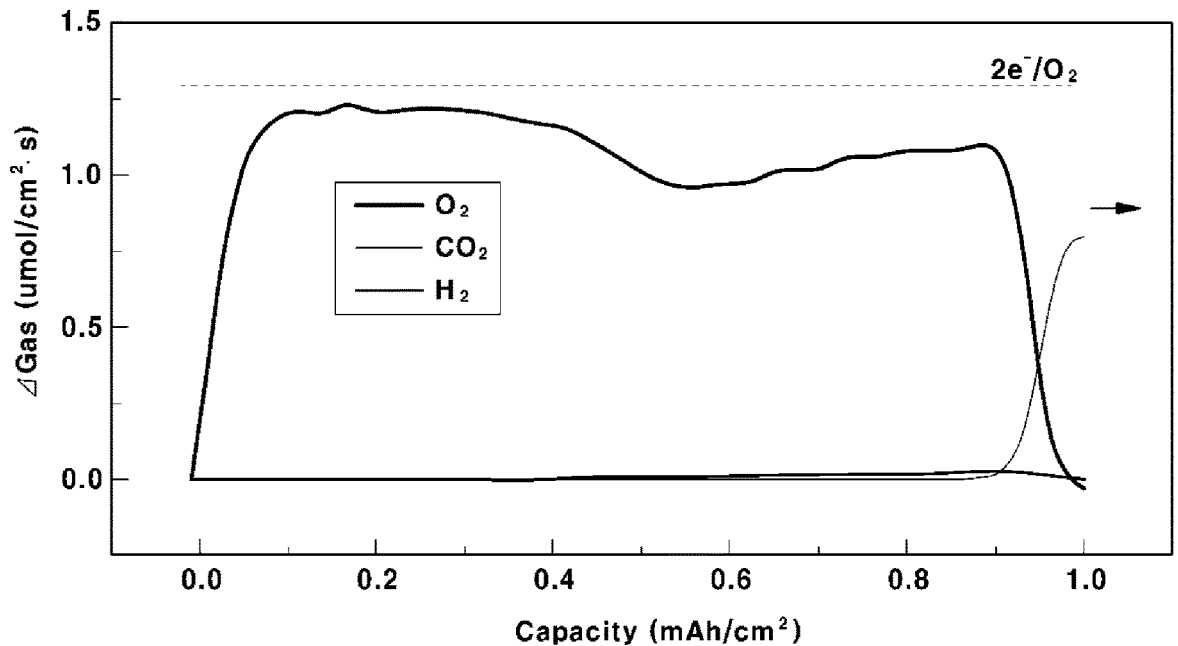
[FIG. 6A]
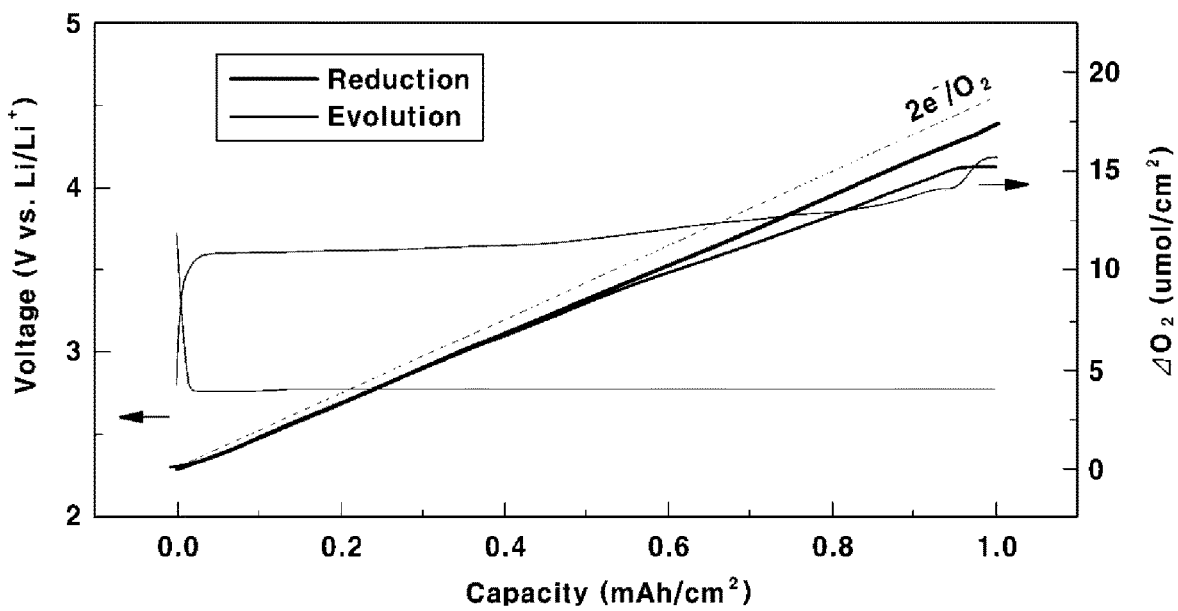

[FIG. 6B]
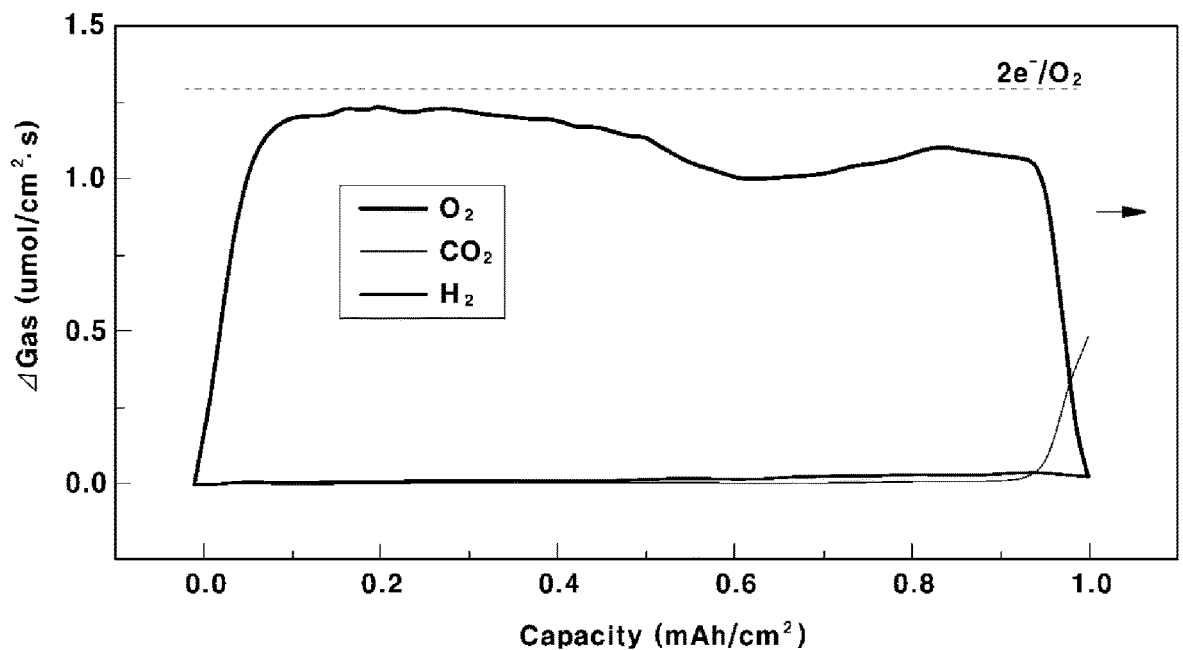
[FIG. 7]
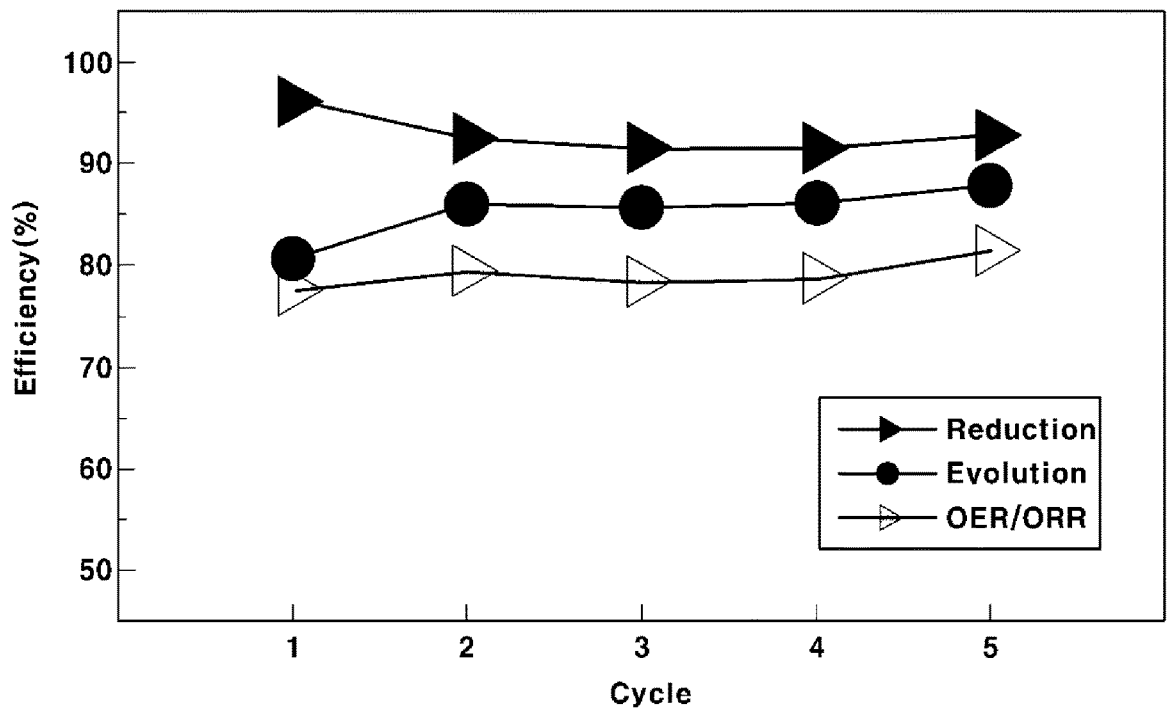

[FIG. 8]
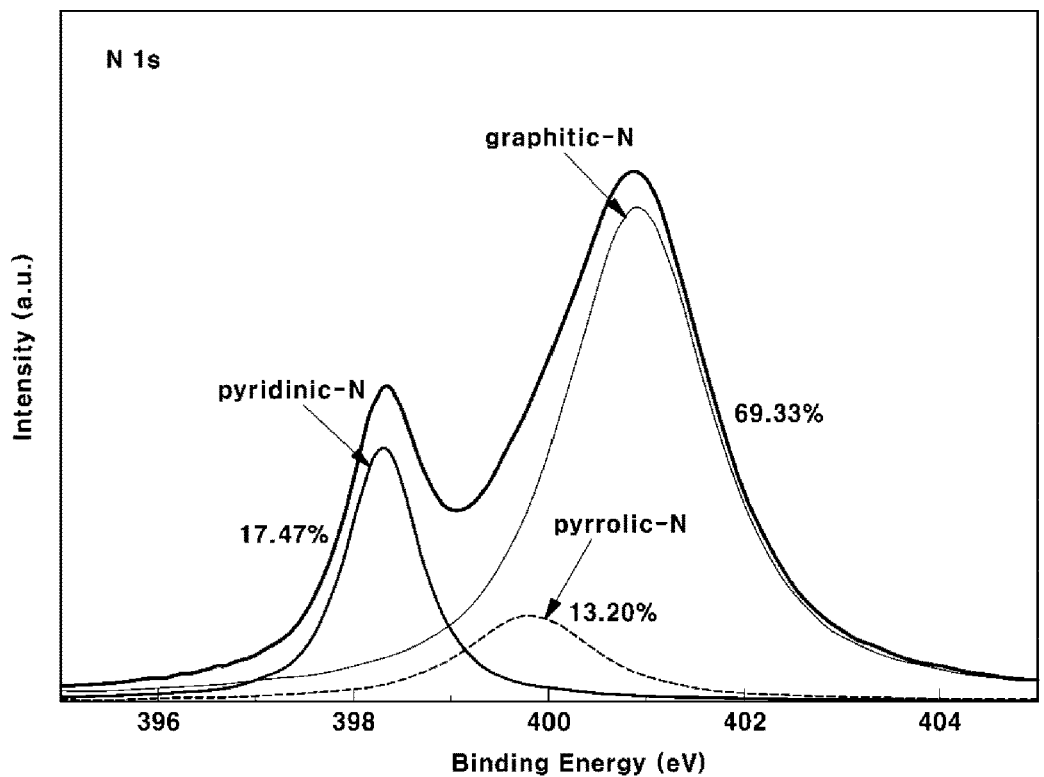
[FIG. 9]
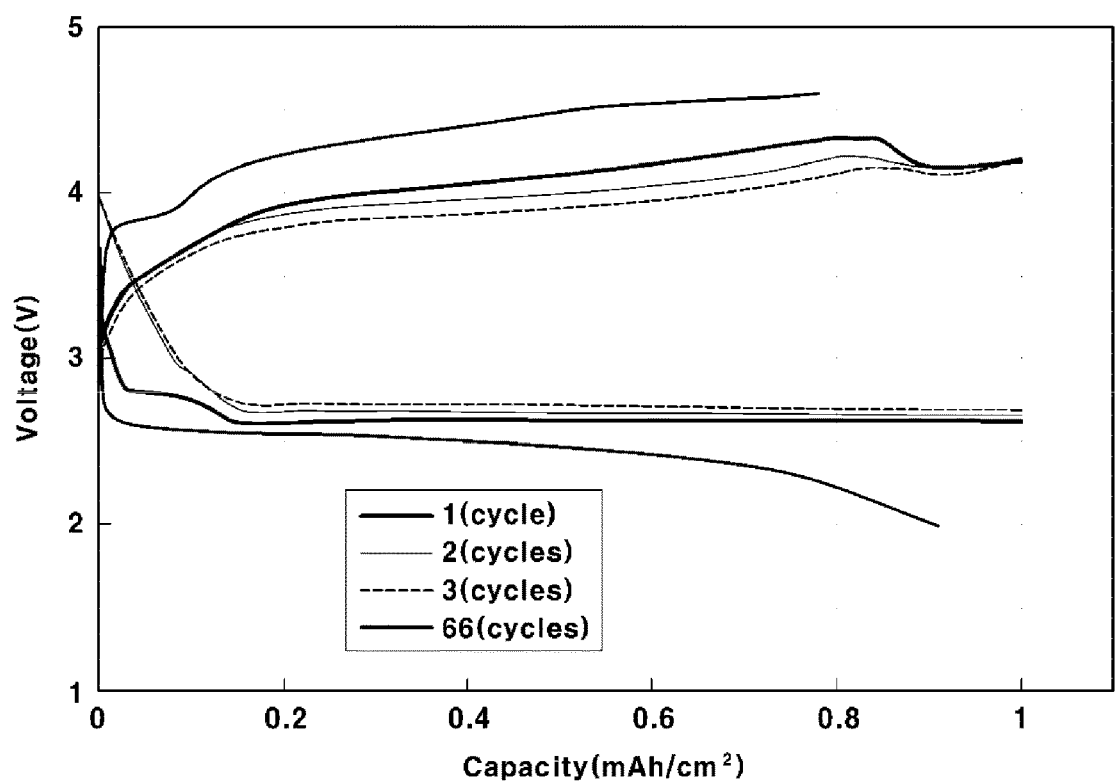

[FIG. 10]
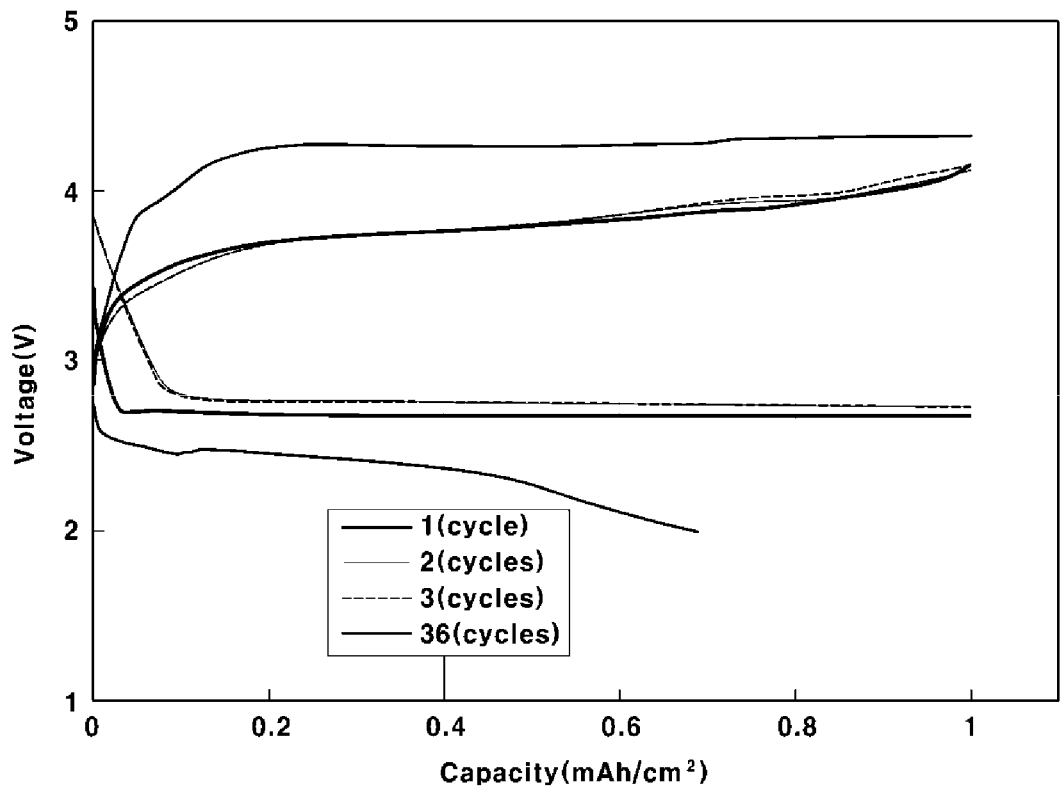
[FIG. 11]
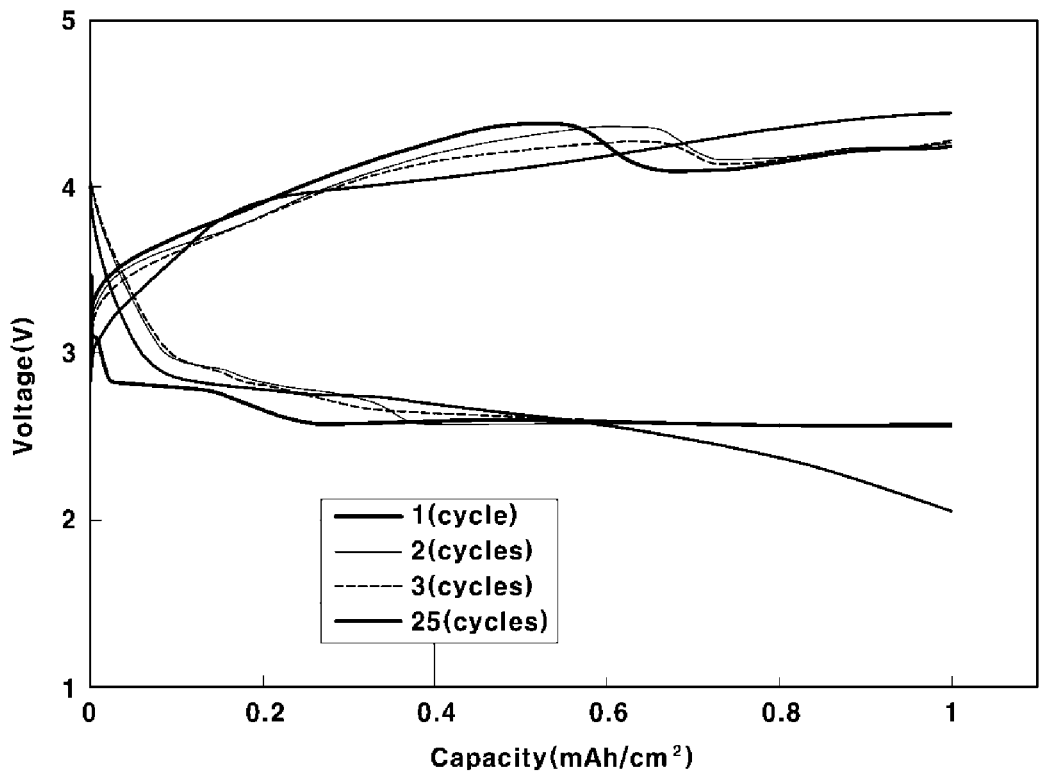

[FIG. 12]
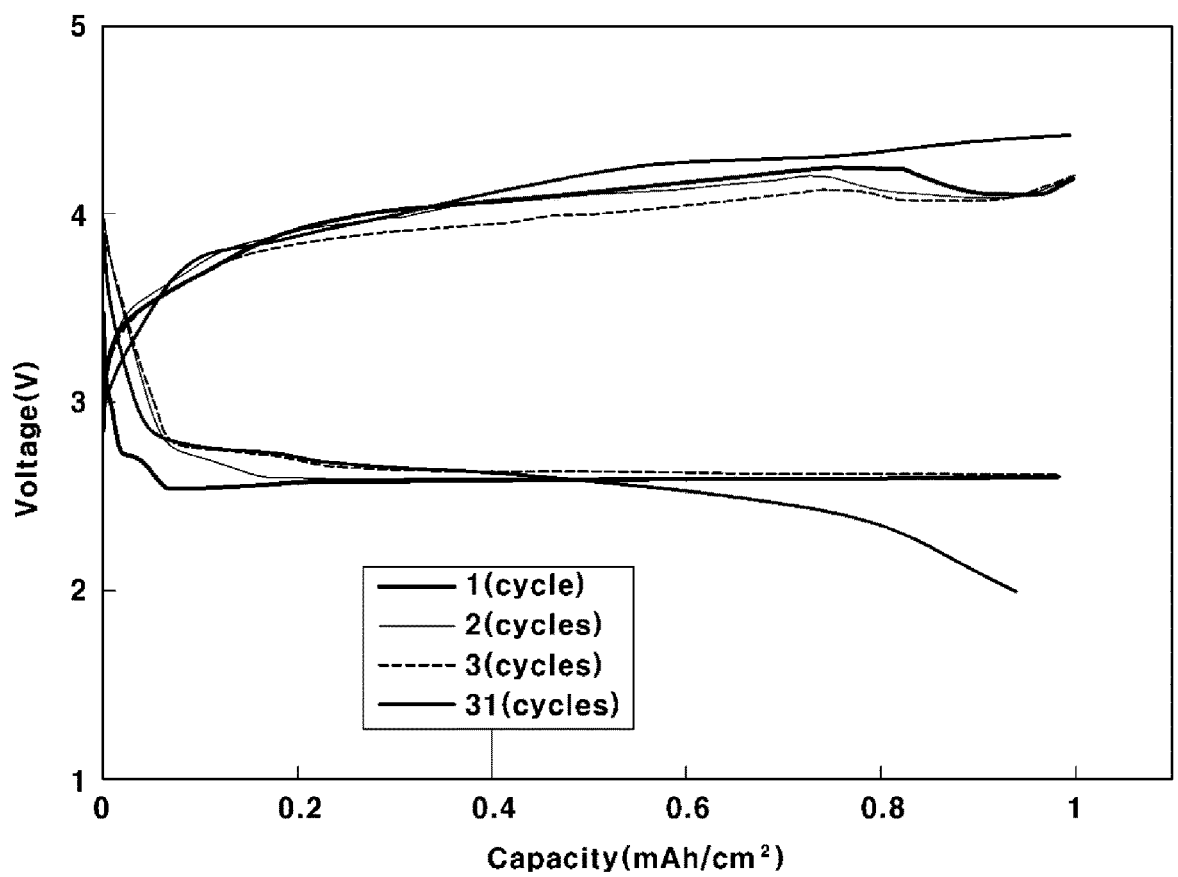

METHOD FOR PREPARING LITHIUM AIR BATTERY INCLUDING NITROGEN-DOPED CARBON CATHODE

CROSS-REFERENCE TO RELATED APPLICATION

This application claims priority to and the benefit of Korean Patent Application No. 10-2018-0108043, filed on Sep. 11, 2018, the entire contents of which are incorporated herein by reference.

FIELD

The present disclosure relates to lithium air batteries and a method for manufacturing a lithium air battery.

BACKGROUND

The statements in this section merely provide background information related to the present disclosure and may not constitute prior art.

In order to practically use lithium air batteries as power sources of vehicles, good activity and durability of batteries is desirable to secure vehicle running distances and lifespan. Carbon materials used for cathodes in conventional lithium air batteries may have defect sites, which disadvantageously cause decomposition as side reactions with electrolytes. In particular, when an organic solvent with high viscosity such as tetraethylene glycol dimethyl ether (TEGDME) is used as an electrolyte, by-products may be produced due to side reactions, which can cause deterioration in battery lifespan.

Recently, technologies to modify carbon materials such as control over structure, and doping with a heterogeneous element have been conducted to improve performance of a cathode in a lithium air battery. Among them, heterogeneous element doping has focused on nitrogen doping by use of ammonia gas or chemical vapor deposition (CVD). In addition, nitrogen doping by such a method was found to affect activity of oxygen reduction reaction (ORR) to some extent. However, most known nitrogen doping methods have a limitation on realizing ORR activity of carbon materials and improving durability.

We have conducted research to improve both activity and durability of batteries by doping defective sites of carbon with a heterogeneous element using a non-destructive method.

SUMMARY

The present disclosure provides a method for manufacturing a lithium air battery that has battery stability by, in one aspect, effectively doping a carbon cathode with nitrogen by repeatedly conducting initial charge/discharge an appropriate number of times on a unit cell containing a first electrolyte with a low viscosity.

The present disclosure provides a method for manufacturing a lithium air battery that can inhibit an electrolyte depletion phenomenon and thus improve battery lifespan by doping a carbon cathode with nitrogen, separating the same and incorporating a second electrolyte with high viscosity and low volatility, to manufacture the lithium air battery.

In one aspect, the present disclosure provides a method for manufacturing a lithium air battery including producing a unit cell including a carbon cathode, a first anode, a first separation membrane disposed between the carbon cathode and first anode, and a first electrolyte immersed in the first separation membrane, doping the carbon cathode with nitrogen by repeatedly discharging and charging the unit cell under an oxygen or air atmosphere, separating the nitrogen-doped carbon cathode from the unit cell, and manufacturing a lithium air battery including the nitrogen-doped carbon cathode, a second anode, a second separation membrane disposed between the nitrogen-doped carbon cathode and the second anode, and a second electrolyte immersed in the second separation membrane.

The carbon cathode may include one or more carbon materials selected from the group consisting of Ketjen black, carbon black, acetylene black, reduced graphene oxide (r-GO) and carbon nanotube.

The first electrolyte may have a viscosity of 0.01 to 1 MPa·s at 25° C.

The first electrolyte may include a nitrogen-containing lithium salt and an organic solvent.

The first electrolyte may include a nitrogen-containing lithium salt with the concentration of 0.1 to 5M.

The nitrogen-containing lithium salt may include one or more carbon materials selected from the group consisting of $LiNO_3$, $LiN(SO_2C_2F_5)_2$, $Li(CF_3SO_2)_2N$, $LiN(SO_2CF_3)_2$ (LiTFSI) and $LiN(SO_2C_2F_5)_2$.

The organic solvent of the first electrolyte may be an amide-based compound.

An amount of nitrogen doped in the nitrogen-doped carbon cathode may be 1 to 5 at %.

The doping of the carbon cathode with nitrogen may include charging and discharging the unit cell 5 to 10 cycles, wherein each charge/discharge cycle is carried out by applying a current to the unit cell under an oxygen atmosphere at a pressure of 1 to 3 bar, at the current of 0.1 to 1.0 $mA/cm^2$ and at a voltage of 2.0 to 4.6V for 10 minutes to 10 hours.

The second electrolyte may have a high viscosity of 1 to 2,000 MPa·s at 25° C.

The second electrolyte may include a lithium salt and an organic solvent.

The second electrolyte may include the lithium salt with a concentration of 0.1 to 5M.

The lithium salt of the second electrolyte may include one or more selected from the group consisting of LiTFSI, $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, LiF, LiBr, LiCl, LiI, $LiB(C_2O_4)_2$, $LiCF_3SO_3$, $LiN(SO_2CF_3)_2$ (LiTFSI), $LiN(SO_2C_2F_5)_2$, $LiC(SO_2CF_3)_3$ and $LiNO_3$.

The organic solvent of the second electrolyte may include one or more selected from the group consisting of an ether-based compound, an amide-based compound, a sulfur-based compound and an ionic liquid.

The lithium air battery may have a reversible oxygen efficiency of 80 to 95%.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a flowchart illustrating a method for manufacturing a lithium air battery;

FIG. 2 is a graph showing lithium ion conductivity depending on type of an organic solvent of an electrolyte;

FIG. 3 is a graph showing volatility over time regarding first and the second electrolytes;

FIG. 4A is a charge/discharge voltage graph after one charge/discharge cycle regarding a lithium air battery including a nitrogen-doped carbon cathode manufactured in Example 1;

FIG. 4B is a graph showing a gas variation after one charge/discharge cycle regarding the lithium air battery including a nitrogen-doped carbon cathode manufactured in Example 1;

FIG. 5A is a charge/discharge voltage graph after three charge/discharge cycles regarding the lithium air battery including a nitrogen-doped carbon cathode manufactured in Example 1;

FIG. 5B is a graph showing a gas variation after three charge/discharge cycles regarding the lithium air battery including a nitrogen-doped carbon cathode manufactured in Example 1;

FIG. 6A is a charge/discharge voltage graph after five charge/discharge cycles regarding the lithium air battery including a nitrogen-doped carbon cathode manufactured in Example 1;

FIG. 6B is a graph showing a gas variation after five charge/discharge cycles regarding the lithium air battery including a nitrogen-doped carbon cathode manufactured in Example 1;

FIG. 7 is a graph showing a voltage variation depending on charge/discharge cycle regarding the lithium air battery manufactured in Example 1;

FIG. 8 is a graph showing a nitrogen binding energy of the nitrogen-doped carbon cathode in the lithium air battery manufactured in Example 1;

FIG. 9 is a charge/discharge graph of the lithium air battery manufactured in Example 1;

FIG. 10 is a charge/discharge graph of the lithium air battery manufactured in Example 2;

FIG. 11 is a charge/discharge graph of the lithium air battery manufactured in Comparative Example 1; and FIG. 12 is a charge/discharge graph of the lithium air battery manufactured in Comparative Example 2.

The drawings described herein are for illustration purposes only and are not intended to limit the scope of the present disclosure in any way.

DETAILED DESCRIPTION

The following description is merely exemplary in nature and is in not intended to limit the present disclosure, application, or uses. It should be understood that throughout the drawings, corresponding reference numerals indicate like or corresponding parts and features.

The aspects of the present disclosure are suggested only to offer thorough and complete understanding of the disclosed context and sufficiently inform those skilled in the art of technical concepts.

In the drawings, the sizes of structures may be exaggerated for clarity. It will be understood that, although the terms "first", "second", etc. may be used herein to describe various elements, these elements should not be limited by these terms and are used only to distinguish one element from another. For example, within the scope of the present disclosure, a first element may be referred to as a second element and, similarly, a second element may be referred to as a first element. Singular forms are intended to include plural forms as well, unless context clearly indicates otherwise.

It will be further understood that the terms "comprises" and/or "has", when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all the numbers, figures and/or expressions. In addition, when numerical ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include numbers such as 10%, 11%, 12% and 13% as well as 30%, and any sub-ranges of 10% to 15%, 12% to 18%, or 20% to 30%, as well as any numbers, such as 10.5%, 15.5% and 25.5%, between appropriate integers that fall within the range.

In general, carbon used as a cathode material in a lithium air battery is one of factors that cause decomposition by side reaction with an electrolyte which deteriorates battery lifespan. In particular, an oxygen functional group on the carbon surface forms a discharge product or reacts with an electrolyte to induce side reaction due to high polarity thereof. Generally, defect sites of carbon causing carbon decomposition should be reduced.

According to the present disclosure, defect sites in a carbon cathode can be effectively doped with nitrogen by repeatedly conducting initial discharge/charge on a unit cell including a first electrolyte for nitrogen doping with low viscosity and high volatility. That is, by substituting the oxygen functional group with high polarity present on the surface of the carbon cathode by stable nitrogen, low polarity can be imparted to the carbon cathode surface. For this reason, side reaction between the carbon cathode and the electrolyte can be reduced, and battery stability and battery lifespan can be improved. In addition, the method according to the present disclosure is non-destructive and is eco-friendly due to low harmfulness as compared to conventional ammonia gas or CVD doping methods.

Furthermore, a lithium air battery is manufactured by doping a carbon cathode with nitrogen, separating the same from a unit cell, forming the nitrogen-doped carbon cathode, a separation membrane and a anode, and incorporating a second electrolyte with high viscosity into the separation membrane so that a depletion phenomenon can be inhibited and battery lifespan can be further improved.

FIG. 1 is a flowchart illustrating a method for manufacturing a lithium air battery according to the present disclosure. Referring to FIG. 1, the method for manufacturing a lithium air battery includes producing a unit cell (S1), doping a carbon cathode with nitrogen by conducting discharge and charge (S2), separating the nitrogen-doped carbon cathode from the unit cell (S3) and manufacturing a lithium air battery (S4).

More specifically, the method for manufacturing a lithium air battery according to the present disclosure includes: producing a unit cell including a carbon cathode, a first anode, a first separation membrane disposed between the carbon cathode and the first anode, and a first electrolyte immersed in the first separation membrane; repeatedly discharging and charging the unit cell under an oxygen or air atmosphere to dope the carbon cathode with nitrogen; separating the nitrogen-doped carbon cathode from the unit cell; and manufacturing a lithium air battery including the nitrogen-doped carbon cathode, a second anode, a second separation membrane disposed between the nitrogen-doped carbon cathode and the second anode, and a second electrolyte immersed in the second separation membrane.

Hereinafter, respective steps for producing the cathode for the lithium air battery according to the present disclosure will be described in more detail with reference to FIG. 1.

1) Producing Unit Cell (S1)

The producing a unit cell (S1) may be producing a unit cell including a carbon cathode, a first anode, a first separation membrane disposed between the carbon cathode and the first anode, and a first electrolyte immersed in the first separation membrane.

The carbon cathode may include a carbon material. The carbon material may include one or more selected from the group consisting of Ketjen black, carbon black, acetylene black, reduced graphene oxide (r-GO) and carbon nanotube.

The carbon cathode has a porous sheet shape which includes an oxygen movement channel to enable oxygen or air to be permeated therein or discharged therefrom.

The carbon cathode may further include a binder. The binder may include one or more selected from the group consisting of polytetrafluoroethylene (PTFE), carboxymethyl cellulose (CMC), polyvinylidene fluoride (PVDF) and butadiene rubber (NBR).

The carbon cathode may further include a catalyst to facilitate decomposition of discharge products. The catalyst may include one or more metals selected from the group consisting of Pt, Au, Ru and Co.

The carbon cathode can be produced by coating a substrate with a slurry prepared by dispersing the carbon material, the binder, the catalyst and the like in a solvent.

The first anode may be a lithium metal. The first separation membrane may be a separation membrane based on a polymer such as polyethylene, polypropylene or a mixture thereof or a separation membrane based on a ceramic such as glass fiber.

The first electrolyte may allow for movement of lithium ions in a unit cell and may include a nitrogen source for nitrogen doping. The first electrolyte may be entirely or partially immersed in the separation membrane and the carbon cathode.

The first electrolyte may be a liquid electrolyte that has low viscosity, as well as high volatility and high ion conductivity, to effectively dope the carbon cathode surface with nitrogen. The first electrolyte has excellent flowability due to low viscosity and is capable of effectively doping the carbon material with nitrogen even at short-time charge/discharge cycles owing to high ion conductivity.

The first electrolyte may be an electrolyte having a low viscosity of 0.01 to 1 MPa·s at 25° C. At this time, when the viscosity is lower than 0.01 MPa·s, the first electrolyte may be depleted before sufficient nitrogen doping due to excessive volatility of electrolyte. On the other hand, when the viscosity is higher than 1 MPa·s, it is difficult for the electrolyte to contact pores in the carbon cathode and it is thus difficult to dope the entire area of the carbon material with nitrogen. The first electrolyte may have a viscosity of 0.1 to 1 MPa·s at 25° C., or between 0.8 to 1 MPa·s. As such, the first electrolyte can be evenly immersed on the surface of the carbon cathode and inside the carbon cathode due to low viscosity. In this case, the first electrolyte can be immersed in the carbon cathode while not blocking the oxygen channel of the carbon cathode.

The first electrolyte may include a nitrogen-containing lithium salt and an organic solvent. The first electrolyte may include the nitrogen-containing lithium salt with a concentration of 0.1 to 5M. When the concentration of the nitrogen-containing lithium salt is lower than 0.1M, satisfactory nitrogen doping effects cannot be obtained, and ion conductivity may be deteriorated. On the other hand, when the concentration is higher than 5M, oxygen mobility may be deteriorated due to excessively high viscosity of the electrolyte and thus ion conductivity may be lowered. The concentration of the nitrogen-containing lithium salt may be 0.1 to 3M, or between 0.5 to 1.5M.

The nitrogen-containing lithium salt of the first electrolyte may include one or more selected from the group consisting of $LiNO_3$, $LiN(SO_2C_2F_5)_2$, $Li(CF_3SO_2)_2N$, $LiN(SO_2CF_3)_2$ (LiTFSI) and $LiN(SO_2C_2F_5)_2$. The organic solvent of the first electrolyte may be an amide-based compound having high volatility. Specifically, the amide-based compound may include one or more selected from the group consisting of dimethylacetamide (DMAc), N-methylformamide (NMF), N-methyl-2-pyrrolidone (NMP) and diethylacetamide (DEA).

2) Doping Carbon Cathode with Nitrogen by Conducting Discharge and Charge (S2)

The step of doping a carbon cathode with nitrogen by conducting discharge and charge (S2) may be a step of doping the carbon cathode with nitrogen by repeatedly discharging and charging a unit cell under an oxygen or air atmosphere. In step (S2), by repeatedly conducting discharge and charge on the unit cell, the nitrogen-containing lithium salt contained in the first electrolyte is ionized and an oxygen functional group with high polarity of the carbon cathode is substituted by nitrogen, so that stability of carbon can be improved. In particular, in step (S2), by using a first electrolyte with low viscosity, high volatility and high ion conductivity, permeability of lithium ions can be improved due to electrochemical attraction during repeated discharge and charge cycles. Such a high permeability of the lithium ions enables a nitrate ion ($NO_3^-$) or an amide-based solvent present on the carbon material surface to permeate pores of the carbon material, to substitute unstable oxygen functional groups or defect sites by nitrogen.

The amount of nitrogen doped in the nitrogen-doped carbon cathode may be 1 to 5 at %. Here, at % means atom %. When the nitrogen doping amount is less than 1 at %, defects of the carbon material surface may not be sufficiently removed. On the other hand, when the nitrogen doping amount is higher than 5 at %, the carbon material surface may be not doped with nitrogen anymore and the surface may be covered with nitrogen by-products. The nitrogen doping amount is 1 to 2.5 at %.

The step of doping the carbon cathode with nitrogen is to charge and discharge a unit cell 5 to 10 times. Each charge/discharge cycle may be carried out by applying a current to a unit cell under an oxygen atmosphere at a pressure of 1 to 3 bar, at the current of 0.1 to 1.0 mA/cm$^2$ and at a voltage of 2.0 to 4.6V for 10 minutes to 10 hours. In particular, in order to effectively and evenly dope the carbon cathode with nitrogen, it is important to conduct charge/discharge on the unit cell 5 to 10 times. The reason for this is that, when charge/discharge is conducted less than 5 times, defect sites on the carbon material surface may not be sufficiently doped with nitrogen and on the other hand, when charge/discharge is conducted more than 10 times, a greater doping effect cannot be obtained due to sufficient nitrogen doping and thus saturation state. In addition, each charge/discharge cycle may be carried out under an oxygen atmosphere at a pressure of 1 to 3 bar, at a current of 0.1 to 1.0 mA/cm$^2$ and at a voltage of 2.0 to 4.6V for 10 minutes to 10 hours. When these conditions are not satisfied, nitrogen doping may not be sufficiently conducted. Accordingly, to favorably dope the carbon cathode with nitrogen, doping may be conducted under suitable charge/discharge cycles, pressure, current and voltage conditions. Each charge/discharge cycle may be carried out by applying a current of 0.2 to 0.8 mA/cm$^2$ to a unit cell at a voltage of 2.0 to 3.0V for 1 to 3 hours.

For the step of doping the carbon cathode with nitrogen, it is important to complete nitrogen doping within a short time before depletion of the first electrolyte because the first electrolyte with low viscosity and high volatility is used. As such, in step (S2), through activation during initial charge/discharge cycles in an oxygen flow open system, defect sites of the carbon cathode can be evenly doped with nitrogen.

3) Separating Nitrogen-Doped Carbon Cathode from Unit Cell (S3)

In the step of separating the nitrogen-doped carbon cathode from the unit cell (S3), after completing doping before depletion of the first electrolyte in step (S2), only the nitrogen-doped carbon cathode can be separated from the unit cell. At this time, when the lithium air battery is used without separating the nitrogen-doped carbon cathode, the first electrolyte remaining in the battery is mixed with a further incorporated second electrolyte, which may deteriorate lithium ion conductivity. Specifically, in step (S2), most the first electrolyte is volatilized due to high volatility thereof, but the part of the electrolyte remains. At this time, the first electrolyte residue in the battery is mixed with the second electrolyte with high viscosity and low volatility, which is further added to provide a long-term operation of the battery and inhibit electrolyte depletion, causing deterioration in lithium ion conductivity. Accordingly, in order to inhibit this, the nitrogen-doped carbon cathode produced in step (S2) may be separated from the unit cell and then a lithium air battery is manufactured. As such, the nitrogen-doped carbon cathode separated in step (S3) may be used as a cathode for lithium air batteries.

4) Manufacturing Lithium Air Battery (S4)

In the step of manufacturing a lithium air battery (S4), a lithium air battery including the nitrogen-doped carbon cathode, a second anode, a second separation membrane disposed between the nitrogen-doped carbon cathode and the second anode, and a second electrolyte immersed in the second separation membrane may be manufactured. More specifically, a lithium air battery having a structure in which the second separation membrane and the second anode are sequentially stacked on the nitrogen-doped carbon cathode separated in step (S3) is manufactured, wherein the second separation membrane may include the second electrolyte with high viscosity and low volatility.

In particular, in order to provide a long-term operation and inhibit electrolyte depletion during battery operation, a second electrolyte with high viscosity and low volatility is used as compared to the first electrolyte for nitrogen doping in step (S1). Specifically, the second electrolyte may be a second liquid electrolyte having a high viscosity of 1 to 2,000 MPa·s at 25° C. At this time, when the viscosity is lower than 1 MPa·s, the electrolyte may be depleted due to high volatility, and on the other hand, when the viscosity is higher than 2,000 MPa·s, transition of lithium ions may be difficult due to low lithium ion conductivity. The second electrolyte may have a viscosity of 5 to 30 MPa·s at 25° C., or between 10 to 18 MPa·s.

The second electrolyte may include the same nitrogen-containing lithium salt and organic solvent as the first electrolyte. In addition, the second electrolyte may include different lithium salt and organic solvent from the first electrolyte. In this case, the second electrolyte may include the lithium salt with a concentration of 0.1 to 5M. When the concentration of the lithium salt is lower than 0.1M, lithium ion conductivity may be low due to less lithium content, and when the concentration of the lithium salt is higher than 5M, lithium ion conductivity may be deteriorated due to high viscosity. The concentration of the lithium salt may be between 0.1 to 3M, or between 0.5 to 1.5M.

The lithium salt of the second electrolyte may include one or more selected from the group consisting of LiTFSI, LiPF$_6$, LiBF$_4$, LiSbF$_6$, LiAsF$_6$, LiN(SO$_2$C$_2$F$_5$)$_2$, Li(CF$_3$SO$_2$)$_2$N, LiC$_4$F$_9$SO$_3$, LiClO$_4$, LiAlO$_2$, LiAlCl$_4$, LiF, LiBr, LiCl, LiI, LiB(C$_2$O$_4$)$_2$, LiCF$_3$SO$_3$, LiN(SO$_2$CF$_3$)$_2$ (LiTFSI), LiN(SO$_2$C$_2$F$_5$)$_2$, LiC(SO$_2$CF$_3$)$_3$ and LiNO$_3$. In one aspect, the lithium salt of the second electrolyte is LiTFSI, LiPF$_6$ or a mixture thereof.

The organic solvent of the second electrolyte may include one or more selected from the group consisting of an ether-based compound, an amide-based compound, a sulfur-based compound and an ionic liquid. For example, when a general carbon cathode not doped with nitrogen is mixed with TEGDME as an organic solvent of the second electrolyte, defects of the carbon surface and serious decomposition reactions occur, which cause formation of by-products such as Li$_2$CO$_3$. The formed by-products were decomposed with a high overvoltage when charged, generating CO$_2$ gas. However, according to the present disclosure, the carbon cathode doped with nitrogen can reduce or avoid decomposition reactions regardless of type of the organic solvent of the second electrolyte, thereby securing battery stability.

Specifically, the ether-based compound, which is one organic solvent of the second electrolyte, may include one or more selected from the group consisting of tetraethylene glycol dimethyl ether (TEGDME), diethylene glycol diethyl ether (DEGDEE), dimethoxyethane (DME) and triethylene glycol dimethyl ether, dibutyl ether, 2-methylene tetrahydrofuran, and tetrahydrofuran.

The amide-based compound may include one or more selected from the group consisting of N-methylformamide (NMF), dimethylacetamide (DMAc), N-methyl-2-pyrrolidone (NMP) and diethylacetamide (DEA).

The sulfur-based compound may include one or more selected from the group consisting of sulfolane (SFL), dimethyl sulfoxide and methyl isopropyl sulfone, ethyl isopropyl sulfone, 2-sulfolene, 3-sulfolene, and 3-fluorosulfolane.

The ionic liquid may include one or more selected from the group consisting of N, N-diethyl-N-methyl-N-(2-methoxyethyl) ammonium, 1-butyl-1-methylpyrrolidinium bis(trifluoromethylsulfonyl)imide ($C_{11}H_{20}F_6N_2O_4S_2$), 1-ethyl-3-methylimidazolium bis(trifluoromethylsulfonyl)imide), triethylsulfonium bis(trifluoromethylsulfonyl)imide, methyl ethylpiperidinium and methyl butyl pyrrolidinium.

The lithium air battery thus manufactured may have a reversible oxygen efficiency of 80 to 95%. When the reversible oxygen efficiency does not satisfy the range defined above, side reactions with the carbon material or electrolyte in the lithium air battery may occur. The reversible oxygen efficiency is 89 to 95%. When the oxygen injected into the lithium air battery is discharged, that is, oxygen reduction reaction (ORR) occurs, only reversible reaction with lithium occurs, as depicted by the following Reaction scheme 1, and oxygen is not consumed by other side reaction. In addition, when the oxygen is charged, that is, oxygen evolution reaction (OER) occurs, reversible reaction occurs, without other side reactions, to produce oxygen, as depicted by the following Reaction Scheme 2. At this time, an ORR/OER rate is referred to as a "reversible oxygen efficiency".

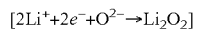
Reaction Scheme 1: $[2Li^+ + 2e^- + O^{2-} \rightarrow Li_2O_2]$

Reaction Scheme 2: $[Li_2O^{2-} \rightarrow 2Li^+ + 2e^+ + O^{2-}]$

Furthermore, in step (S4), the second anode may be a lithium metal. The second separation membrane may be a polymer-based separation membrane including polyethylene, polypropylene or a mixture thereof, or a ceramic-based separation membrane including glass fiber.

Hereinafter, the present forms will be described in more detail with reference to Example and should not be construed as limiting the scope of the present disclosure.

Example 1

A carbon sheet with a thickness of 220 μm was used as a gas diffusion layer. Ketjen black was used as a carbon cathode material, and a binder containing polytetrafluoroethylene (PTFE) and carboxymethyl cellulose (CMC) in a ratio of 9:1 wt % was used as a binder. Water was used as a solvent. A lithium metal was used as first and second anodes. At this time, the lithium anode herein used was a 500 μm lithium metal foil. The first and second separation membranes herein used were polyethylene with a thickness of 25 μm. The first electrolyte herein used was a mixture of 1M $LiNO_3$ with DMAc. The first electrolyte had a viscosity of 0.945 MPa·s at 25° C. The second electrolyte herein used was a mixture of 1M LiTFSI with TEGDME. The second electrolyte had a viscosity of 14.65 MPa·s at 25° C.

(1) Production of Carbon Cathode 100 parts by weight of water, 90 parts by weight of Ketjen black and 10 parts by weight of a binder were mixed to prepare a cathode slurry. Then, a gas diffusion layer with a thickness of 220 μm was coated to a thickness of 600 μm with the cathode slurry by a doctor blade method, and dried at 100° C. for 120 minutes to form a carbon cathode layer. At this time, the amount of the loaded carbon cathode was 4 mg/cm².

(2) Production of Unit Cell Including Nitrogen-Doped Carbon Cathode

The first separation membrane was immersed with 70 μl of a first electrolyte for 1 minute. Then, a first separation membrane and a first lithium anode were sequentially stacked on the carbon cathode layer by an ordinary method to produce a coin cell-type unit cell. Then, discharge and charge were repeatedly conducted an appropriate number of times by applying a current of 0.5 mA/cm² under a 99.999% oxygen atmosphere, at a pressure of 2 bar and at a voltage of 2V for 120 minutes. At this time, while repeatedly discharging and charging the unit cell, the carbon cathode was doped with nitrogen. Then, only the nitrogen-doped carbon cathode was separated from the unit cell.

(3) Production of Lithium Air Battery Including Second Electrolyte

The second separation membrane was immersed with 70 μl of the second electrolyte for 1 minute. Then, the second separation membrane and the second anode were sequentially stacked on the nitrogen-doped carbon cathode by an ordinary method to produce a lithium air battery.

Example 2

A lithium air battery was manufactured in the same manner as in Example 1, except that a mixture of 1M $LiNO_3$ with DMAc was used as a second electrolyte.

Comparative Example 1

A lithium air battery was manufactured in the same manner as in Example 1, except that a mixture of 1M LiTFSI with TEGDME was used as a first electrolyte and a mixture of 1M LiTFSI with TEGDME was used as a second electrolyte.

Comparative Example 2

A lithium air battery was manufactured in the same manner as in Example 1, except that a mixture of 1M LiTFSI with TEGDME was used as a first electrolyte and a mixture of 1M $LiNO_3$ with DMAc was used as a second electrolyte.

Test Example 1-1: Evaluation of Lithium Ion Conductivity Depending on Organic Solvent of Electrolyte In order to evaluate lithium ion conductivity depending on type of the organic solvent in the electrolyte, DEGDEE and TEGDME were selected as ether-based compounds, DMAc was selected as an amide-based compound, and sulfolane was selected as a sulfur-based compound. Then, a coin cell with an SUS/electrolyte/SUS structure was formed by an ordinary method using each organic solvent and ion conductivity was evaluated through impedance. Results are shown in FIG. 2.

FIG. 2 is a graph showing lithium ion conductivity depending on type of the organic solvent of the electrolyte. As can be seen from FIG. 2, the amide-based compound, i.e., DMAc, exhibited 2 or more times higher lithium ion conductivity than ether-based compounds, i.e., DEGDEE and TEGDME. Next to the DMAc solvent, DEGDEE and TEGDME exhibited high lithium ion conductivity in this order, and the sulfur-based compound, i.e., sulfolane exhibited the lowest lithium ion conductivity.

Test Example 1-2: Measurement of Volatility Depending on First and Second Electrolytes Volatility over time was measured for the first electrolyte and the second electrolyte. Specifically, a mixture of 1M $LiNO_3$ with DMAc was used as a representative example of the first electrolyte. A mixture of 1M LiTFSI with TEGDME was used as an example of the second electrolyte. In addition, a mixture of 1M LiTFSI with DEGDEE was used as another example of the second electrolyte. Weight reduction of only each electrolyte over time was measured at 60° C. by TGA to evaluate volatility. Results are shown in FIG. 3.

FIG. 3 is a graph showing volatility over time regarding the first electrolyte and the second electrolyte. It can be seen from FIG. 3 that, when compared, based on volatility at 80% by weight, the first electrolyte including a mixture of 1M $LiNO_3$ with DMAc was volatilized at 20% by weight within about 5 minutes. In addition, the second electrolyte including a mixture of 1M LiTFSI with DEGDEE was volatilized within about 10 minutes, which means that the second electrolyte had low volatility as compared to the first electrolyte. Furthermore, the second electrolyte including a mixture of 1M LiTFSI with TEGDME was volatilized at about 4% by weight even after 60 minutes, which means that the second electrolyte exhibited the lowest volatility.

Test Example 2-1: Gas Analysis of Lithium Air Battery Including Nitrogen-Doped Carbon Cathode During Initial Charge/Discharge Charge/discharge voltage and amounts of $O_2$ and $CO_2$ gases generated during initial charge/discharge of the lithium air battery including a nitrogen-doped carbon cathode produced in Example 1 were measured using a differential electrochemical mass spectrometer (DEMS) as a gas analysis apparatus. Results are shown in FIGS. 4A to 6B and FIG. 7.

FIGS. 4A, 5A and 6A are charge/discharge voltage graphs after one-, three- and five charge/discharge cycles regarding the lithium air battery including a nitrogen-doped carbon cathode manufactured in Example 1. As can be seen from FIG. 4A, a by-product such as $Li_2CO_3$ was produced by decomposition reaction between the carbon cathode and the electrolyte and, at the same time, overvoltage occurred. FIG. 5A shows reduced by-product generation and thus decreased overvoltage, as compared to FIG. 4A. FIG. 6A shows greatly reduced overvoltage caused by removal of defect sites of the carbon cathode by nitrogen doping of the carbon cathode surface during five charge/discharge cycles.

FIGS. 4B, 5B and 6B are graphs showing gas variations after one-, three- and five charge/discharge cycles regarding the lithium air battery including a nitrogen-doped carbon cathode manufactured in Example 1. FIGS. 4B and 5B show that a by-product was generated by decomposition reaction between the carbon cathode and the electrolyte, and a great amount of $CO_2$ gas was generated when the by-product was decomposed during charge. As the number of cycles increased, generation of by-products was reduced, $CO_2$ gas was rapidly decreased, and reversible $O_2$ content was increased, as shown in FIG. 6B.

FIG. 7 is a graph showing variations in voltage depending on charge/discharge cycle regarding the lithium air battery manufactured in Example 1. As can be seen from FIG. 7, the number of cycles was increased until, regarding gases generated by doping the carbon cathode with nitrogen, $CO_2$ reached the lowest and $O_2$ reached the highest. As a result, as the number of charge/discharge cycles increased, defect sites of the carbon cathode were removed and oxygen efficiency was increased. When the number of cycles was 5, the maximum oxygen efficiency was seen. That is, as oxygen evolution reaction (OER) and oxygen reduction reaction (ORR) were increased, reversible oxygen efficiency of OER/ORR was increased. Here, it can be seen that a quantitative measurement value of about 90% was the maximum oxygen efficiency, since the remaining oxygen of about 10% was saturated in the electrolyte and thus could not be collected.

Test Example 2-2: Observation of Amount of Nitrogen Doped in Carbon Cathode in Lithium Air Battery Regarding the lithium air batteries including nitrogen-doped carbon cathodes manufactured in Example 1 and Comparative Example 1, oxygen efficiency depending on number of initial charge/discharge cycles, nitrogen doping amount and battery lifespan were evaluated. At this time, oxygen efficiency was measured using DEMS, and the nitrogen doping amount was measured using X-ray photoelectron spectroscopy (XPS). The battery lifespan was measured by conducting charge/discharge at a current of 0.5 $mA/cm^2$ and at a voltage of 2V voltage. Results are shown in Tables 1 and 2 and FIG. 8.

TABLE 1

| Item | The number of initial charge/ discharge cycles | Content of each element | | |
|---|---|---|---|---|
| | | C (at %) | O (at %) | N (at %) |
| Comparative Example 1 | 5 cycles | 97.47 | 2.53 | — |
| Example 1 | 5 cycles | 96.45 | 2.51 | 1.04 |

As can be seen from results shown in Table 1, in Comparative Example 1, nitrogen was not doped, whereas, in Example 1, when initial charge/discharge was conducted 5 cycles, nitrogen was doped in about 1.04 at %.

FIG. 8 is a graph showing a nitrogen binding energy of the nitrogen-doped carbon cathode in the lithium air battery manufactured in Example 1. As can be seen from results shown in FIG. 8, after initial charge/discharge was conducted 5 times, pyridinic N and graphitic N were produced at about 398 eV and 401 eV, respectively, which corresponded to defect sites of the carbon cathode. That is, as can be seen from FIG. 8, high values of pyridinic N and graphitic N were present, which means that nitrogen was doped at positions where ORR activity between carbon atoms was high and stable. Conventional nitrogen-doped carbon cathodes were usually doped in the form of pyrrolic N due to $NH_4$ gas. Pyrrolic N-type doping disadvantageously caused decomposition due to creation of carbon defects. In addition, the pyrrolic structure was known to have lower ORR activity as compared to pyridinic N and graphitic N structures.

TABLE 2

| Item | Number of charge/ discharge cycle | Oxygen efficiency % (ORR/OER) | N doping amount (at %) | Battery lifespan (cycle) |
|---|---|---|---|---|
| Example 1 | 1 cycle | 80.64 | 0.4 | 38 cycles |
| | 2 cycles | 85.99 | 0.6 | 42 cycles |
| | 3 cycles | 85.61 | 0.7 | 55 cycles |
| | 4 cycles | 86.10 | 0.9 | 60 cycles |

TABLE 2-continued

| Item | Number of charge/ discharge cycle | Oxygen efficiency % (ORR/OER) | N doping amount (at %) | Battery lifespan (cycle) |
|---|---|---|---|---|
| | 5 cycles | 87.81 | 1.04 | 65 cycles |
| | 6 cycles | 87.79 | 1.05 | 66 cycles |
| Comparative Example 1 | 6 cycles | 72.83 | 0 | 25 cycles |

As can be seen from results shown in Table 2, as the number of initial charge/discharge cycles increased, nitrogen doping amount and battery lifespan increased. In addition, at 5 or more cycles, the nitrogen doping amount and battery lifespan were not greatly increased, which means that all defect sites of the carbon cathode were doped with an appropriate amount of nitrogen. Furthermore, when the number of initial charge/discharge cycles was 5 or more, nitrogen doping amount was slightly increased and when the number thereof was higher than 10, saturation was seen and there was no significant variation in oxygen efficiency and battery lifespan.

Test Example 3: Evaluation of Battery Lifespan of Lithium Air Battery

Regarding lithium air batteries manufactured in Examples 1 and 2 and Comparative Examples 1 and 2, initial charge/discharge was conducted 5 cycles and then a second electrolyte was further incorporated in the lithium air batteries. In order to evaluate battery lifespan of the lithium air batteries thus manufactured, charge/discharge was conducted at a current of 0.5 mA/cm$^2$ and a voltage of 2V for 120 minutes. Results are shown in the following Table 3 and FIGS. 9 to 12. FIGS. 9 and 10 are charge/discharge graphs of the lithium air batteries manufactured in Examples 1 and 2. FIGS. 11 and 12 are charge/discharge graphs of the lithium air batteries manufactured in Comparative Examples 1 and 2.

TABLE 3

| | First electrolyte for doping nitrogen | | | | Second electrolyte for batteries | | | |
|---|---|---|---|---|---|---|---|---|
| Item | Lithium salt | Organic solvent | Viscosity at 25° C. (mPa · s) | N doping amount (at %) | Lithium salt | Organic solvent | Viscosity at 25° C. (mPa · s) | Battery lifespan (cycles) |
| Ex. 1 | LiNO$_3$ | DMAc | 0.945 | 1.04 | LiTFSI | TEGDME | 14.65 | 66 cycles |
| Ex. 2 | LiNO$_3$ | DMAc | 0.945 | 1.04 | LiNO$_3$ | DMAc | 0.945 | 36 cycles |
| Comp. Ex. 1 | LiTFSI | TEGDME | 14.65 | 0 | LiTFSI | TEGDME | 14.65 | 25 cycles |
| Comp. Ex. 2 | LiTFSI | TEGDME | 14.65 | 0 | LiNO$_3$ | DMAc | 0.945 | 25 cycles |

As can be seen from results of Table 3 and FIGS. 9 to 12, Comparative Example 1 wherein the carbon cathode was not doped with nitrogen exhibited battery deterioration and generation of by-products due to surface defect sites of the carbon cathode and serious side reactions, since TEGDME was used as an organic solvent of the first and second electrolytes. In addition, in Comparative Example 2, since a mixture of 1M LiNO$_3$ with DMAc was used for the second electrolyte, upon doping of the carbon cathode with nitrogen, decomposition reaction between the carbon cathode and the electrolyte was inhibited and battery lifespan was thus slightly increased, as compared to Comparative Example 1. However, improvement in the battery lifespan was considerably lower than in Examples 1 and 2.

On the other hand, in Example 1, since discharge/charge was repeatedly conducted using a first electrolyte with a low viscosity including DMAc, side reaction of battery was significantly reduced by doping the carbon cathode with nitrogen. For this reason, battery lifespan corresponded to 66 cycles which was 2 or more times higher than in Comparative Examples 1 and 2. In addition, there was no deterioration due to electrolyte depletion, since a lithium air battery was produced by decomposing the nitrogen-doped carbon cathode and incorporating a second electrolyte with high viscosity including TEGDME therein, before depletion of the first electrolyte. Furthermore, in Example 2, although the same ingredient was used for the first electrolyte and the second electrolyte, relatively improved battery lifespan could be obtained, as compared to Comparative Examples 1 and 2.

As apparent from the foregoing, the method for manufacturing a lithium air battery according to the present disclosure can reduce side reaction between the carbon cathode and electrolytes, and thus secure battery stability by effectively doping the carbon cathode with nitrogen by repeatedly conducting initial discharge and charge on a unit cell including a first electrolyte with a low viscosity.

In addition, the method for manufacturing a lithium air battery according to the present disclosure is non-destructive and is eco-friendly due to low harmfulness as compared to conventional doping methods.

Furthermore, the method for manufacturing a lithium air battery according to the present disclosure can inhibit a depletion phenomenon and further improve battery lifespan by manufacturing a lithium air battery by doping a carbon cathode with nitrogen, separating the same from a unit cell and incorporating a second electrolyte with a high viscosity into the separation membrane electrolyte.

The effects of the present disclosure are not limited to those mentioned above. It should be understood that the effects of the present disclosure include all effects that can be inferred from the description of the present disclosure.

The aspects have been described in detail with reference to forms thereof. However, it will be appreciated by those skilled in the art that changes may be made in these forms without departing from the principles and spirit of the disclosure.

What is claimed is:

1. A method for manufacturing a lithium air battery comprising:
   producing a unit cell comprising a carbon cathode, a first anode, a first separation membrane disposed between the carbon cathode and first anode, and a first electrolyte impregnated in the first separation membrane;

doping the carbon cathode with nitrogen by repeatedly discharging and charging the unit cell under an oxygen or air atmosphere to form a nitrogen-doped carbon cathode;

separating the nitrogen-doped carbon cathode from the unit cell; and manufacturing the lithium air battery to include the nitrogen-doped carbon cathode, a second anode, a second separation membrane disposed between the nitrogen-doped carbon cathode and the second anode, and a second electrolyte impregnated in the second separation membrane.

2. The method according to claim 1, wherein the carbon cathode comprises one or more carbon materials selected from the group consisting of Ketjen black, carbon black, acetylene black, reduced graphene oxide (r-GO) and carbon nanotube.

3. The method according to claim 1, wherein the first electrolyte has a viscosity of 0.01 to 1 MPa·s at 25° C.

4. The method according to claim 1, wherein the first electrolyte comprises a nitrogen-containing lithium salt and an organic solvent.

5. The method according to claim 4, wherein the first electrolyte comprises the nitrogen-containing lithium salt with a concentration of 0.1 to 5 M.

6. The method according to claim 4, wherein the nitrogen-containing lithium salt comprises one or more carbon materials selected from the group consisting of $LiNO_3$, $Li(CF_3SO_2)_2N$, $LiN(SO_2CF_3)_2$(LiTFSI) and $LiN(SO_2C_2F_5)_2$.

7. The method according to claim 4, wherein the organic solvent of the first electrolyte is an amide-based compound.

8. The method according to claim 1, wherein an amount of nitrogen doped in the nitrogen-doped carbon cathode is 1 to 5 at %.

9. The method according to claim 1, wherein the doping of the carbon cathode with nitrogen comprises charging and discharging the unit cell for five to ten cycles, wherein each charge/discharge cycle is carried out by applying a current to the unit cell under an oxygen atmosphere at a pressure of 1 to 3 bar, at the current of 0.1 to 1.0 mA/cm² and at a voltage of 2.0 to 4.6 V for 10 minutes to 10 hours.

10. The method according to claim 1, wherein the second electrolyte has a viscosity of 1 to 2,000 MPa·s at 25° C.

11. The method according to claim 1, wherein the second electrolyte comprises a lithium salt and an organic solvent.

12. The method according to claim 11, wherein the second electrolyte comprises the lithium salt with a concentration of 0.1 to 5 M.

13. The method according to claim 11, wherein the lithium salt of the second electrolyte comprises one or more selected from the group consisting of LiTFSI, $LiPF_6$, $LiBF_4$, $LiSbF_6$, $LiAsF_6$, $Li(CF_3SO_2)_2N$, $LiC_4F_9SO_3$, $LiClO_4$, $LiAlO_2$, $LAlCl_4$, LiF, LiBr, LiCl, LiI, $LiB(C_2O_4)_2$, $LiCF_3SO_3$, $LiN(SO_2CF_3)_2$(LiTFSI), $LiN(SO_2C_2F_5)_2$, $LiC(SO_2CF_3)_3$ and $LiNO_3$.

14. The method according to claim 11, wherein the organic solvent of the second electrolyte comprises one or more selected from the group consisting of an ether-based compound, an amide-based compound, a sulfur-based compound and an ionic liquid.

15. The method according to claim 11, wherein the lithium air battery has a reversible oxygen efficiency of 80 to 95%.

\* \* \* \* \*